United States Patent
Gonze et al.

(10) Patent No.: US 7,862,635 B2
(45) Date of Patent: Jan. 4, 2011

(54) SHIELDED REGENERATION HEATING ELEMENT FOR A PARTICULATE FILTER

(75) Inventors: Eugene V. Gonze, Pinckney, MI (US); Frank Ament, Troy, MI (US)

(73) Assignee: GM Global Technology Operations, Inc.

( * ) Notice: Subject to any disclaimer, the term of this patent is extended or adjusted under 35 U.S.C. 154(b) by 776 days.

(21) Appl. No.: 11/673,933

(22) Filed: Feb. 12, 2007

(65) Prior Publication Data

US 2008/0190292 A1  Aug. 14, 2008

(51) Int. Cl.
  B01D 24/00 (2006.01)
  B01D 39/00 (2006.01)
  B01D 50/00 (2006.01)
  F01N 3/10 (2006.01)
  F01N 3/02 (2006.01)
  F01N 3/04 (2006.01)
  B01J 23/10 (2006.01)

(52) U.S. Cl. .......... 55/282.3; 55/522; 55/523; 55/524; 422/177; 422/178; 422/179; 422/180; 422/181; 422/182; 60/303; 60/304; 60/305; 60/306; 60/307; 60/308; 60/309; 60/310; 60/311; 502/303

(58) Field of Classification Search .......... 55/522–524, 55/282.3; 422/177–182; 502/303; 60/303–311
See application file for complete search history.

(56) References Cited

U.S. PATENT DOCUMENTS

| | | | |
|---|---|---|---|
| 3,748,901 A * | 7/1973 | DeBaun | 73/861.66 |
| 3,969,083 A * | 7/1976 | Givens et al. | 422/171 |
| 4,427,418 A * | 1/1984 | Kogiso et al. | 55/287 |
| 4,505,726 A | 3/1985 | Takeuchi | |
| 4,512,786 A * | 4/1985 | Sakurai et al. | 55/282 |
| 4,516,993 A | 5/1985 | Takeuchi | |
| 4,535,589 A * | 8/1985 | Yoshida et al. | 60/303 |
| 4,744,216 A * | 5/1988 | Rao et al. | 60/303 |
| 4,872,889 A * | 10/1989 | Lepperhoff et al. | 55/282.3 |
| 4,934,142 A * | 6/1990 | Hayashi et al. | 60/297 |
| 5,144,798 A * | 9/1992 | Kojima et al. | 60/303 |
| 5,171,335 A * | 12/1992 | Kojima et al. | 55/523 |
| 5,190,571 A * | 3/1993 | Fay et al. | 55/523 |
| 5,207,807 A * | 5/1993 | Manfre et al. | 55/282.1 |
| 5,259,190 A * | 11/1993 | Bagley et al. | 60/300 |
| 5,294,411 A * | 3/1994 | Breuer et al. | 422/174 |
| 5,468,143 A * | 11/1995 | Weber et al. | 431/243 |
| 5,472,462 A * | 12/1995 | Pischinger et al. | 55/282 |
| 5,716,586 A * | 2/1998 | Taniguchi | 422/173 |
| 6,464,947 B2 * | 10/2002 | Balland | 422/180 |
| 6,572,682 B2 * | 6/2003 | Peter et al. | 95/278 |
| 6,655,133 B2 * | 12/2003 | Mikami et al. | 60/296 |

(Continued)

FOREIGN PATENT DOCUMENTS

CN  1512043  7/2004

(Continued)

*Primary Examiner*—Walter D Griffin
*Assistant Examiner*—Amber Orlando (57) ABSTRACT

An exhaust system includes a particulate filter (PF) that is disposed downstream from an engine. The PF filters particulates within an exhaust from the engine. A heating element heats particulate matter in the PF. A catalyst substrate or a flow converter is disposed upstream from said heating element. The catalyst substrate oxidizes the exhaust prior to reception by the heating element. The flow converter converts turbulent exhaust flow to laminar exhaust flow prior to reception by the heating element.

4 Claims, 5 Drawing Sheets

U.S. PATENT DOCUMENTS

| | | | |
|---|---|---|---|
| 6,813,884 B2* | 11/2004 | Shigapov et al. | 60/295 |
| 6,989,048 B2* | 1/2006 | Bardon et al. | 95/278 |
| 7,062,904 B1* | 6/2006 | Hu et al. | 60/286 |
| 7,497,078 B2* | 3/2009 | Hiranuma et al. | 60/295 |
| 2003/0202918 A1* | 10/2003 | Ashida et al. | 422/180 |
| 2005/0214178 A1* | 9/2005 | LaBarge et al. | 422/180 |
| 2006/0254231 A1* | 11/2006 | Hayashi et al. | 55/523 |
| 2006/0272319 A1* | 12/2006 | Dettling et al. | 60/295 |
| 2007/0020155 A1* | 1/2007 | Ohno et al. | 422/177 |
| 2007/0068128 A1* | 3/2007 | Oshimi et al. | 55/523 |
| 2007/0119053 A1* | 5/2007 | Shimada et al. | 29/890 |
| 2007/0169453 A1* | 7/2007 | Hayakawa | 55/523 |
| 2007/0240396 A1* | 10/2007 | Mizutani | 55/523 |

FOREIGN PATENT DOCUMENTS

| | | | |
|---|---|---|---|
| CN | 1666014 | | 9/2005 |
| CN | 1861992 | | 11/2006 |
| WO | WO2004036002 | * | 4/2004 |
| WO | WO2005056165 | * | 6/2005 |
| WO | WO2005089902 | * | 9/2005 |

* cited by examiner

SHIELDED REGENERATION HEATING ELEMENT FOR A PARTICULATE FILTER

STATEMENT OF GOVERNMENT RIGHTS

Certain of the subject matter of the present application was developed under Contract Number DE-FC-04-03 AL67635 awarded by the Department of Energy. The U.S. government has certain rights in this invention.

FIELD

The present disclosure relates to particulate filters and more particularly to regeneration techniques of the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A diesel combustion cycle produces particulates that are typically filtered from a diesel exhaust gas by a particulate filter (PF). The PF is disposed in an exhaust system of a corresponding diesel engine. The PF reduces emissions of particulate matter (soot) that is generated during a heterogeneous combustion process. Over time, the PF becomes full and trapped diesel particulates must be removed. During a regeneration process, the diesel particulates are burned within the PF.

An engine control system can estimate the particulate accumulation and determine when the filter needs regeneration. Once it is determined that the filter is full or filled to a predetermined level of particulate, the control system enables regeneration by modifying the combustion process and/or injecting fuel into the exhaust system. The fuel is injected into the exhaust stream after a main combustion event. The post-injected fuel is combusted over one or more catalysts of the PF. The heat released during combustion of the injected fuel on the catalysts increases the exhaust temperature, which burns the trapped soot particles in the PF. The elevated exhaust temperatures initiate oxidation of the stored soot within the PF. This approach, however, can result in higher temperature excursions than desired, which can be detrimental to exhaust system components including the PF.

SUMMARY

Accordingly, an exhaust system that processes exhaust generated by an engine to regenerate a particulate filter is provided. The system includes a particulate filter (PF) that is disposed downstream from and that filters particulates within the exhaust. A heating element heats particulate matter in the PF. A catalyst substrate is disposed upstream from the heating element and oxidizes the exhaust prior to reception by the heating element.

In other features, an exhaust system that processes exhaust generated by an engine to regenerate a particulate filter is provided. The system includes a PF that is disposed downstream of and that filters particulates within the exhaust. A heating element heats particulate matter in the PF. A flow converter is disposed upstream from the heating element and converts turbulent exhaust flow to laminar exhaust flow prior to reception by the heating element.

Further areas of applicability will become apparent from the description provided herein. It should be understood that the description and specific examples are intended for purposes of illustration only and are not intended to limit the scope of the present disclosure.

DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 1:
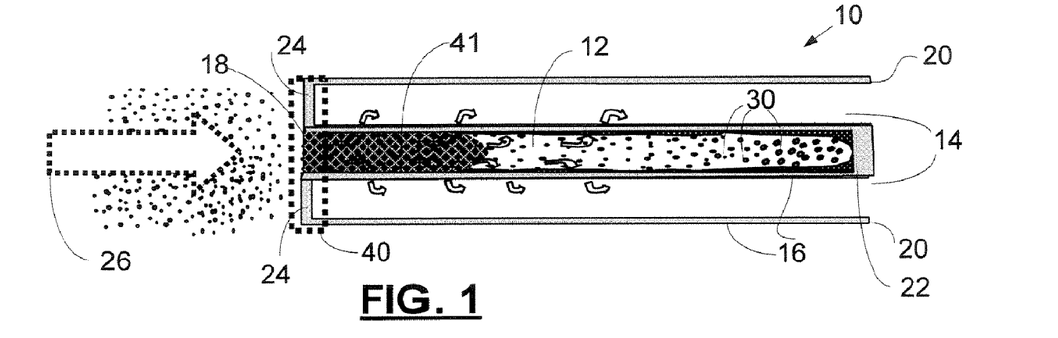
FIG. 1 is a cross-sectional view of a portion of a particulate filter (PF)

Referring now to FIG. 1, a cross-sectional view of a portion 10 of a particulate filter (PF) is shown. The PF includes multiple inlet cells/channels 12 and outlet cells/channels 14, which have associated channel walls 16. The inlet channels 12 have inlets 18 and the outlet channels 14 have outlets 20. The inlet channels 12 are in an alternating arrangement relative to the outlet channels 14. The inlet channels 12 have outlet plugs 22 and the outlet channels 14 have inlet plugs 24. The outlet plugs 22 and the inlet plugs 24 may be integrally formed as part of the walls 16. The walls 16 perform as filters for an entering engine exhaust, designated by arrow 26. The exhaust 26 enters the inlets 18 and passes from the inlet channels 12 to the outlet channels 14 through the walls 16. The channel walls 16 prevent particle matter 30 from entering the outlet channels 14 and thus collects in the inlet channels 12 against the channel walls 16.

To remove the collected particle matter or soot 30, inlet regions 40 proximate to the inlets 18 are heated. When the exhaust 26 is heated in the inlet region 40, the collected particle matter in that region ignites. The flame generated from the burning of the particle matter travels along and within the associated inlet channels of the PF. This heating may be generated via an electrical interface, such as one or more heating elements, as described in more detail below. The heating is accomplished with minimal electrical power. The heating provides uniform heat distribution and limited peak temperatures within the PF, thereby preventing damage to the PF. The heating may be performed during a low fuel consumption regeneration cycle. In other words, a minimal amount of fuel may be injected in the exhaust system and/or PF system during regeneration of the PF.

Figure 2:
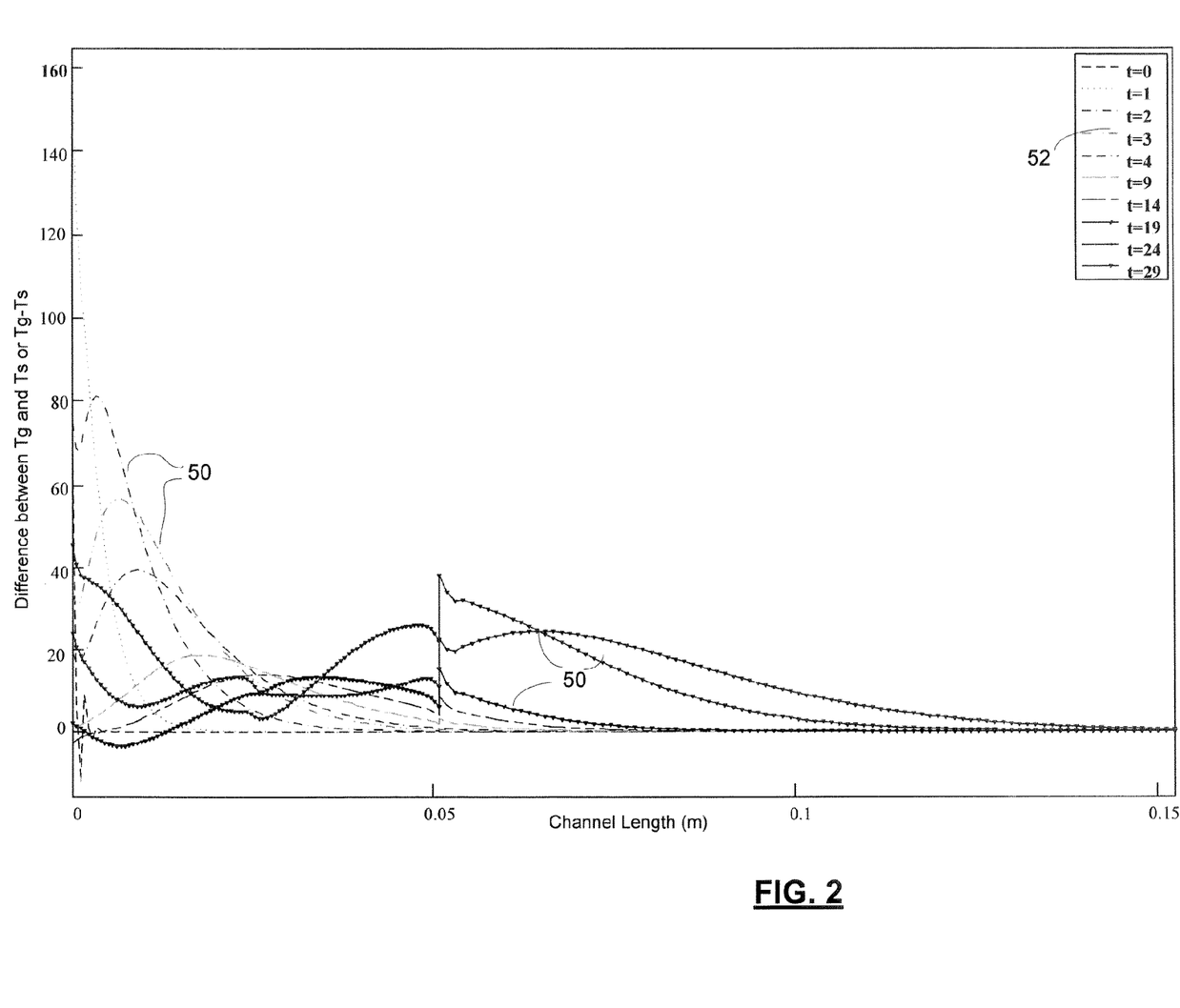
FIG. 2 is a graph illustrating a temperature profile within the length of a catalyst substrate or PF during a cold start emission test.

Referring now to FIG. 2, a graph illustrating a temperature profile within the length of a catalyst substrate or PF during a cold start emission test is shown. The catalyst substrate has multiple catalyst bricks, which are coupled in series. A contact point between a front catalyst brick and a rear catalyst brick is represented by a spike in temperature differences at 0.05 m. The spike is caused by a misalignment between channels of the catalyst bricks. Multiple curves 50 are shown and represent time in seconds, as provided by the key 52. The curves 50 provide a relationship between the difference in $T_{gas}$ and $T_{solid}$ for the PF versus channel length or position along the longitudinal length of the channel. $T_{gas}$ is the temperature of the exhaust and $T_{solid}$ is the temperature of the substrate.

As can be seen from the graph, a large temperature loss occurs at a front surface of the PF, due to turbulent heat transfer at the inlets of the PF or cell entrance locations. The front surface corresponds with channel length 0. The hot exhaust gas heats up the front surface of the PF where the flow is highly turbulent. The hot exhaust gas heats the front surface until a thermal equilibrium is met over time. Since the flow of the exhaust becomes laminar a short distance down the channels of the PF, the heat transfer loss decreases. Thus, the rear surface of the PF, where the exhaust flow is laminar, experiences a gradual change in temperature with time. The $T_{gas}/T_{solid}$ temperature difference approaches 0 near the rear surface. For this reason, the rear surface experiences smaller thermal losses than the front surface.

Thus, a heating element is used to raise the temperature of the substrate to oxidize the soot on the front surface. This prevents heating element energy loss due to convective heating of the exhaust gas, which then flows thru the substrate walls and out "clean" cold outlet channels thereof.

When a PF heating element is used to heat the front surface of the PF, the temperature of the heating element is increased to exceed an ignition point of the soot. Heating a front surface of a PF to a hot enough temperature that allows particulate matter to burn creates a flame front that propagates down or longitudinally along the channel of the PF cleaning the soot from the filter. The PF may be formed of electrically resistive material, which provides an efficient technique to generate heat. However, thermal losses to a cooler exhaust gas, as well as radiant heat loss to metal exhaust pipes increases the electrical power used to meet desired ignition temperatures. When the heating element receives turbulent exhaust flow, a significant amount of heat loss is exhibited, which reduces the temperature of the heating element. A large portion of this heat loss is radiant heat loss.

Radiant heat loss is energy emitted from a high temperature object and is usually infrared light. Since particulate matter requires high temperatures for combustion, the radiant heat losses are a significant source of lost energy. The Stefan-Boltzmann law states that the power loss due to radiant energy is proportional to the fourth power of a temperature difference between emitting and absorbing surfaces, ie: $Q_{RAD} \sim A(T_H^4 - T_L^4)$. $Q_{RAD}$ is radiant heat loss, A is the Stefan-Boltzmann law constant, $T_H$ is the temperature of the heating element, and $T_L$ is the temperature of the exhaust gases and/or other components near the heating element. Because the heating element temperature needed to initiate soot burn is high, the heating surface radiant heat loss associated with the heating element is high.

To contain or reflect this radiant energy and utilize this energy to facilitate the burning of the soot, catalyst substrate/flow converter implementations are used, as described below. To achieve high heating element temperatures needed for soot ignition, with minimum electrical power, convective losses to exhaust gas flow are minimized. This is done by converting turbulent exhaust flow to laminar exhaust flow. A flow converter converts turbulent flow into laminar flow prior to reception by a heating element. In the below described embodiments, radiant energy losses are reduced by allowing the radiant energy to reflect and/or be contained on a surface of a shielding substrate near a heating element. Hence conductive heat losses to an exhaust piping are reduced, and the radiant energy is contained near the heating element itself. The stated energy reflection and containment significantly improves the electrical efficiency of regenerating a PF.

Figure 3:
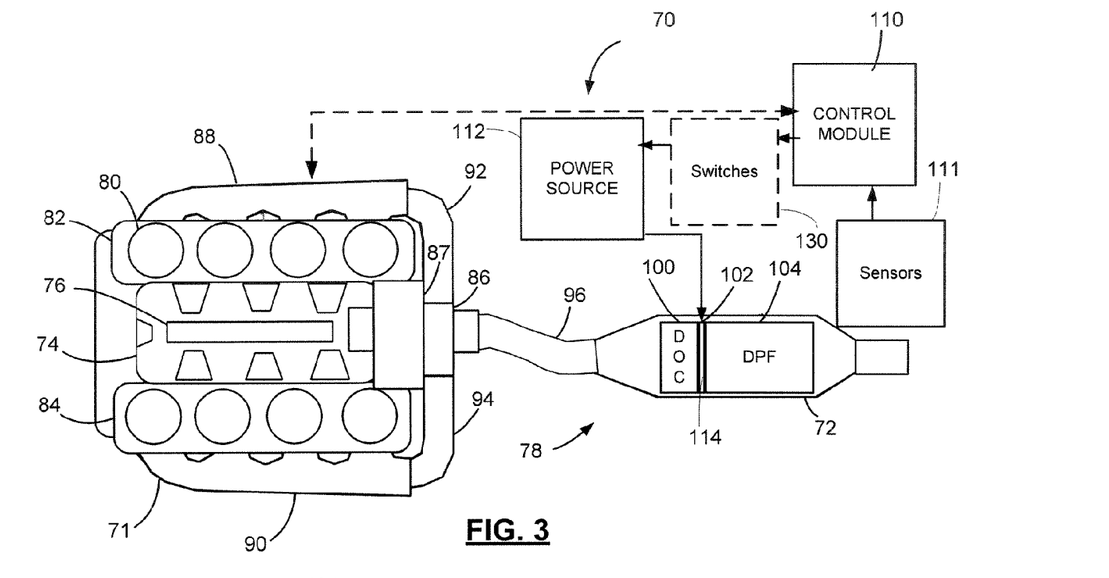
FIG. 3 is a functional block diagram of an exemplary diesel engine system including an exhaust particulate filter system in accordance with an embodiment of the present invention.

Referring now to FIG. 3, a functional block diagram of an exemplary diesel engine system 70 including an exhaust PF system 72 is shown. It is appreciated that the diesel engine system 70 is merely exemplary in nature and that the zone heated particulate filter regeneration system described herein can be implemented in various engine systems that have a particulate filter. Such engine systems may include, but are not limited to, gasoline direct injection engine systems and homogeneous charge compression ignition engine systems.

The engine system 70 includes a diesel engine 71, an intake manifold 74, a common rail fuel injection system 76 and an exhaust system 78. The engine 71 combusts an air and fuel mixture to produce drive torque. The exemplary engine 71 includes eight cylinders 80 configured in adjacent cylinder banks 82, 84 in V-type layout. Although FIG. 3 depicts eight cylinders (N=8), it can be appreciated that the engine 71 may include additional or fewer cylinders 80. For example, engines having 2, 4, 5, 6, 8, 10, 12 and 16 cylinders are contemplated. It is also anticipated that the particulate filter regeneration control of the present invention can be implemented in an inline-type or another type of cylinder configuration.

Air is drawn into the intake manifold 74 through a throttle (not shown). Air is drawn into the cylinders 80 from the intake manifold 74 and is compressed therein. Fuel is injected into cylinder 80 by the common rail injection system 76 and the heat of the compressed air ignites the air/fuel mixture. The exhaust gases are exhausted from the cylinders 80 into the exhaust system 78. In some instances, the engine system 70 can include a turbocharger that uses an exhaust driven turbine 86 to drive a compressor 87 that compresses the air entering the intake manifold 74. The compressed air typically passes through an air cooler (not shown) before entering into the intake manifold 74.

The exhaust system 78 includes exhaust manifolds 88, 90, exhaust conduits 92, 94, and 96, and the PF system 72, which for the embodiment shown may be referred to as a diesel PF system. The exhaust manifolds 88, 90 direct the exhaust exiting corresponding cylinder banks 82, 84 into the exhaust conduits 92, 94. Optionally, an EGR valve (not shown) recirculates a portion of the exhaust back into the intake manifold 82. The remainder of the exhaust is directed into the turbocharger 78 to drive a turbine. The turbine facilitates the compression of the fresh air received from the intake manifold 74. A combined exhaust stream flows from the turbocharger through the exhaust conduit 96 and the PF system 72.

The PF system 72 includes a catalyst substrate/flow converter 100, such as a diesel oxidizing catalyst (DOC), a heating element 102 and a PF 104. The PF 104 is shown as a diesel particle filter (DPF) for the stated embodiment. The PF system 72 filters particulates from the combined exhaust stream from the exhaust conduits 92, 94 prior to entering the atmosphere. The flow converter 100 performs as a heat shield and oxidizes the exhaust based on the post combustion air/fuel ratio. The amount of oxidation increases the temperature of the exhaust. The heating element 102 increases the temperature of the front surface of the PF 104 prior to the exhaust entering the DPF 104, which initiates burning of the collected soot therein. The DPF 104 receives exhaust from the flow converter 100 and filters soot particulates present in the exhaust. In one embodiment, the flow converter 100 includes and/or is an open cell/channel substrate and the DPF 104 includes and/or is a closed cell/channel substrate. The flow converter 100 has an internal flow through configuration whereas the DPF 104 performs as a filter. The flow converter 100 and the DPF 104 may be formed of ceramic material, a silicon carbide material, a metallic material, or other suitable materials.

Use of the flow converter 100, alleviates the above-described radiant thermal losses and maintains laminar exhaust flow on the heating element 102. The flow converter 100 converts turbulent exhaust flow into laminar exhaust flow prior to reception by the heating element 102. This improves the heating element efficiency by allowing laminar exhaust flow over the surfaces of the heating element 102.

A control module 110 regulates operation of the system 70 according to the oxygen based particulate filter regeneration method of the present invention. The system 70 may include various sensors 111, such as temperature sensors, air flow sensors, air-fuel sensors, and other sensors for status determination and control of the system 70. The control module 110 determines when regeneration is needed and controls engine operation to allow regeneration to occur. Based on status signals received from the sensors, the control module 110 controls engine operation at regeneration levels throughout the regeneration process.

A control module 110 controls the engine 71 and PF regeneration based on various sensed information. More specifically, the control module 110 estimates loading of the DPF 104. When the estimated loading achieves a threshold level (e.g., 5 grams/liter of particulate matter) and the exhaust flow rate is within a desired range. Current is controlled to the DPF 104 and provided via the control module 110 and a power source 112 to initiate the regeneration process. The current from the power source may be supplied directly to the DPF 104, as shown, or supplied to the control module 110 prior to being received by the DPF 104. The duration of the regeneration process varies based upon the amount of particulate matter within the DPF 104. It is anticipated, that the regeneration process can last between 2-6 minutes. Current is only applied, however, during an initial portion of the regeneration process. More specifically, the electric energy heats a front surface 114 of the DPF 104 for a threshold period (e.g., 1-2 minutes). Exhaust passing through the front surface 114 is heated. The remainder of the regeneration process is achieved using the heat generated by combustion of particulate matter present near the front surface 114 or by the heated exhaust passing through the DPF 104. For a further explanation or examples of zoning and heating element control see U.S. patent application Ser. No. 11/233,450 filed on Mar. 22, 2006 and entitled, "Zoned Heated Inlet Ignited Diesel Particulate Filter Regeneration", which is incorporated by reference in its entirety herein.

Figure 4:
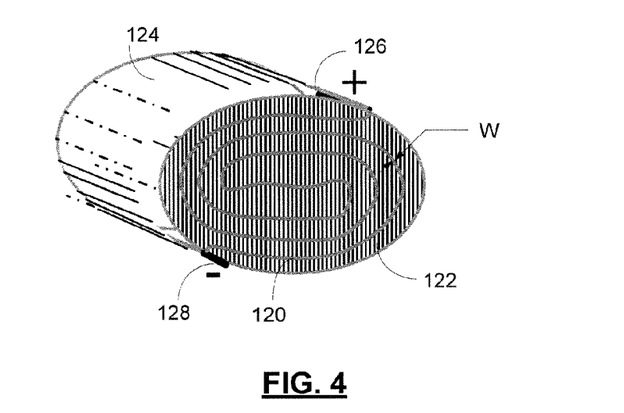
FIG. 4 is a perspective view of an example grid/heating element, as applied to a front surface of a PF in accordance with an embodiment of the present invention.

Referring now to FIG. 4, a perspective view of an example grid/heating element 120, as applied to a front surface 122 of a PF 124 is shown. The heating element 120 may be of various shapes and sizes and arranged in various configurations and patterns. For example, the width W of the heating element or conductive path thereof may vary per application. Although the heating element 120, as shown, has a single positive connector 126 and a single negative connector 128, it may have any number of connectors. Also, any number of heating elements may be incorporated. As another example, each connector pair and heating element and/or segmented portion thereof may be associated with a particular coverage zone on the front surface 122. Heating of the front surface 122 via multiple zones reduces the electrical impact on a PF system during regeneration. Each zone can be heated separately by supplying power to a pathway of resistive material located within each zone. In one embodiment, the heating element 120 is formed from a sheet of electrically resistive material, such as a metallic material, an example of which is stainless steel. The heating element may be stamped, milled, cut using a waterjet cutting machine, or formed using some other suitable technique.

By dividing the front surface 122 into multiple heated zones, the material of the heating element 120 can be dispersed more uniformly to evenly heat the front surface 122. This minimizes the cross-sectional area of a particular heated area and broadens soot combustion to adjacent channels. As a result, the total particulate matter consumed is maximized, while the amount of initially heated area and the amount of electrical power used for such heating is minimized. Within each zone, it is also appreciated that the heating element 120 may form resistive pathways or bands of material. The resistive pathways may be porous or have holes for exhaust flow therethrough. It is further appreciated that each of the zones may be heated sequentially, simultaneously, or selectively on an as needed basis.

Referring now to FIGS. 3 and 4, the control module 110 controls the heating of each zone individually. Switches 130, when incorporated, may be selectively activated and deactivated to allow current to flow to each zone. For example, voltage is supplied via the power source 112 to the switches 130.

Figure 5:
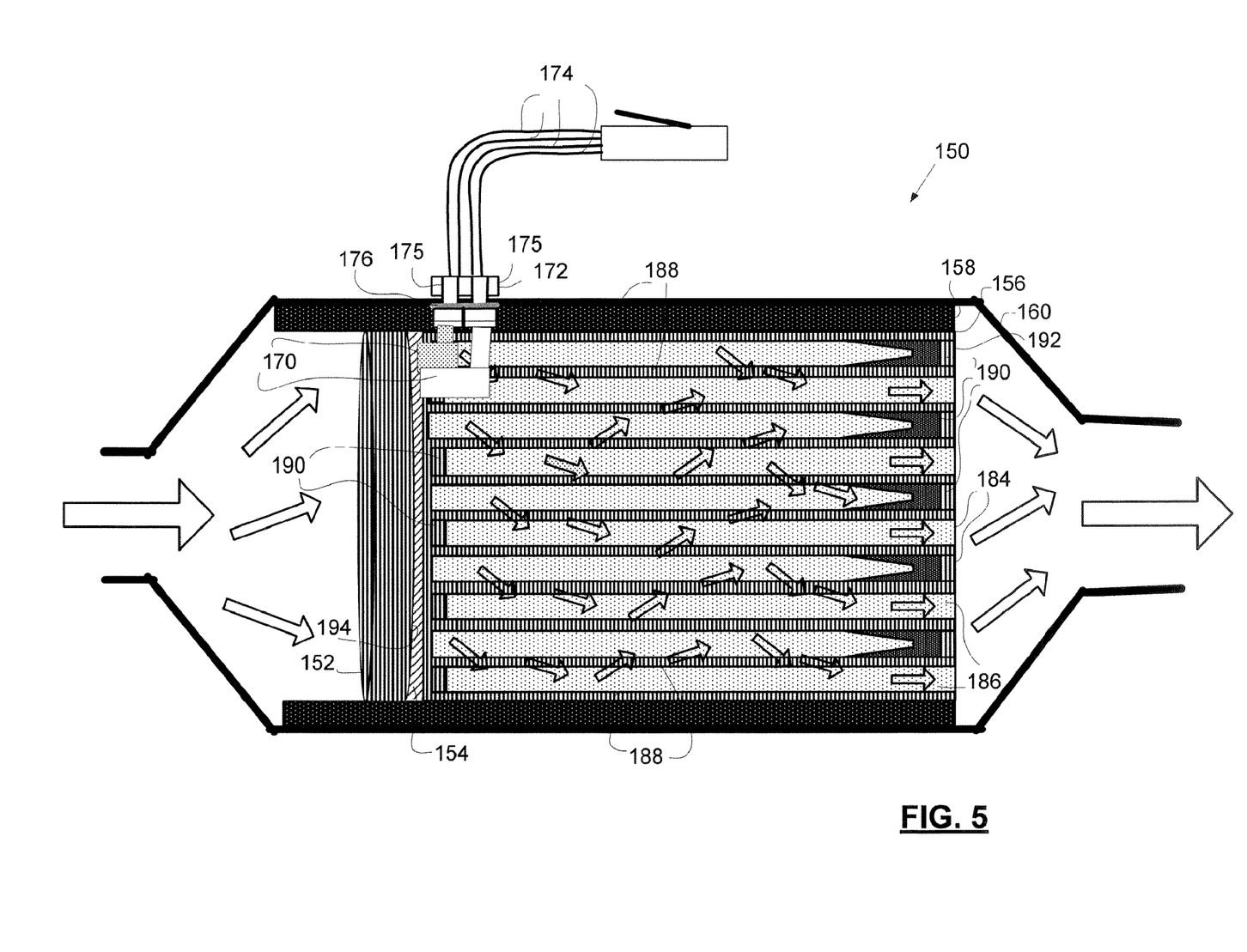
FIG. 5 is a cross-sectional side view of a PF system in accordance with an embodiment of the present invention.

Referring now to FIG. 5, a cross-sectional side view of a PF system 150 is shown. The PF system 150, as shown includes a flow converter 152, a grid 154 and a PF 156, which are coupled in series. The flow converter 152, the grid 154 and the PF 156 are butted to each other and are held in place via a mat 158, which in turn is held by a housing 160. During the manufacturing of the PF system 150 the flow converter 152, the grid 154 and the PF 156 are butted together and held in place. This assures that the grid 154 is held between the flow converter 152 and the PF 156. The mat 158, which is a semi-soft flexible sleeve, is wrapped around and tightly holds the flow converter 152, the grid 154 and the PF 156. The mat 158 is then enclosed within the housing 160, which may be a welded can, as shown. The mat 158 may be formed of an insulating material, such as vermiculite or other insulating material.

The PF system 150 also includes electrical contact terminals 170, which are coupled to the grid 154. A connector 172 connects insulated wires 174 via pins 175 to the terminals 170. Electrical energy is supplied via the wires 174 to each of the terminals 170. The connector 172 is coupled to the housing 160. The terminals 170 are sealed to the mat 158 via a high temperature conductive seal 176.

Note that the grid 154 may also be attached to the flow converter 152 or the PF 156. The heating element 154 may be attached to the flow converter 152 or the PF 156 using various fasteners and/or fastening techniques. The attaching of the grid 154 to the flow converter 152 or the PF 156 controls movement of the heating element 154 when current is applied thereto. When temperature of the heating element 154 increases, the material of the heating element 154 expands. Since the heating element 154 may have a maximum operating temperature of approximately between 700-1000° C., the heating element 154 or portions thereof may exhibit a significant amount of shape change or lateral movement. The expansion movement is within the laterally planar section of the PF system 150 in which it is positioned. The use of fasteners aids in preventing or limiting such movement. The fasteners also prevent short circuits between adjacent portions of the heating element. In one embodiment, the fasteners are placed along the heating element or resistive/conductive path thereof at predetermined intervals, such as 2-5 centimeter intervals. Examples of such attachment are described with respect to the embodiments of FIGS. 6 and 7. The fasteners may be in the form of pins, barbed pins, plugs, tabs, clips, etc. The fasteners may be formed of metal or other suitable materials.

The PF 156 may be a monolith particulate trap and includes alternating inlet cells/channels 184 and outlet cells/channels 186. The cells/channels 184, 186 extend axially along the PF 156. Walls 188 of the PF 156 may include a porous ceramic honeycomb wall of cordierite material. It is appreciated that any ceramic comb material is considered within the scope of the present invention. Adjacent channels are alternatively plugged at each end as shown at 190. This forces the diesel aerosol through the porous substrate walls which act as a mechanical filter. Particulate matter is deposited within the inlet channels 184 and exhaust exits through the outlet channels 186. Soot particles 192 flow into the PF 156 and are trapped therein.

The flow converter 152 is configured similar to the PF 156. However, the flow converter does not have endplugs and is thus in a flow through configuration. The flow converter 152 may undergo one or more various processes to improve the radiant reflective properties thereof. For example, the flow converter 152 may be metallically coated. The flow converter 152 may perform as or be replaced with a radiant energy reflector block. A radiant energy reflector block may be sized and located the same as the flow converter 152. The radiant energy reflector block reflects radiant energy. The radiant energy reflector block may provide a turbulent flow exchange as opposed to a turbulent to laminar flow exchange. The flow converter/radiant energy reflector block may be of various sizes, shapes and configurations. Although not shown, the flow converter has channels similar to the channels 184, 186, in which the below described fasteners may attach. The grid 154 attaches to the rear surface 194 of the flow converter 152.

Figure 6:
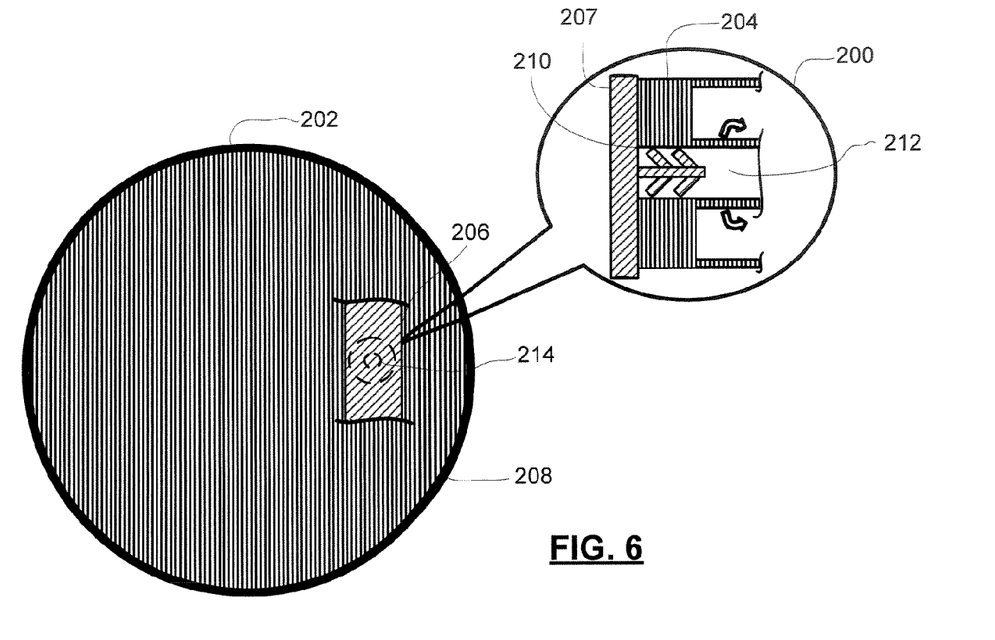
FIG. 6 is a close-up cross-sectional side view of a portion of a PF illustrating an example heating element fastener in accordance with an embodiment of the present invention.
Figure 7:
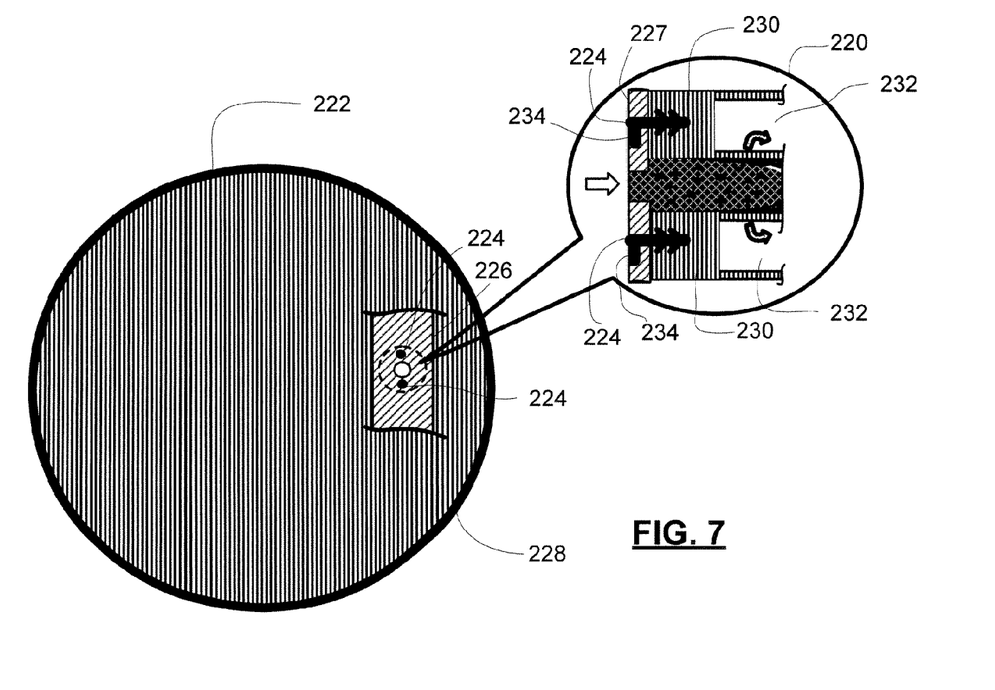
FIG. 7 is a close-up cross-sectional side view of a portion of a PF illustrating example heating element fasteners in accordance with another embodiment of the present invention.

Although the following FIGS. 6 and 7 are described primarily with respect to the attachment of a heating element to a PF, the heating element may be attached to other catalyst substrates or to a flow converter using similar techniques.

Referring now to FIG. 6, a close-up cross-sectional side view of a portion 200 of a PF 202 illustrating an example heating element fastener 204 is shown. A pathway section 206 of a heating element pathway of a heating element 207 is shown over a front surface 208 of the PF 202. The heating element 207 is held onto the front surface 208 via one or more fasteners, such as the fastener 204. The fastener 204 may be integrally formed as part of the pathway section 206 and be inserted into an inlet 210 of a channel 212. The fastener 204 may be shaped or formed to allow easy assembly, but difficult disassembly. For example, the fastener 204 may be a barbed tab as shown or take on some other form. The fastener 204 may not completely plug the inlet 210 and thus may allow for exhaust flow therethrough. An opening 214 is shown through which exhaust may flow. As such, the fastener 204 may wick heat into the channel 212, which further facilitates the burning of the soot therein.

Referring now to FIG. 7, a close-up cross-sectional side view of a portion 220 of a PF 222 illustrating example heating element fasteners 224 is shown. A pathway section 226 of a heating element pathway of a heating element 227 is shown over a front surface 228 of the PF 222. The heating element pathway is held onto the front surface 228 via the fasteners 224, which are shown as pins. The fasteners 224 may be inserted into or attached to endplugs 230 of outlet channels 232 of the PF 222. The fasteners 224 may also be created and/or formed as part of the endplugs 230. The fasteners 224 may be embedded into the PF 222, as shown, and allow for the attachment of the heating element pathway. The heating element pathway may be snapped under ends 234 of the fasteners 224. Note that the heating element pathway may be porous and allow for exhaust flow therethrough, as shown. As an alternative, the heating element pathway may be arranged on the PF, such that the inlet channel openings are positioned between pathway sections.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of performing a regeneration process within an exhaust system comprising:
   preventing radiant energy from being released from the exhaust system including passing an exhaust from an engine through a radiant energy reflector block prior to reception by a heating element,
   wherein said radiant energy reflector block is arranged upstream from said heating element;
   heating particulate matter in a particulate filter (PF) via said heating element; and
   filtering particulates from said exhaust with said PF.

2. A method as in claim 1 further comprising:
   converting turbulent flow of said exhaust to laminar flow prior to reception by said heating element; and
   oxidizing said exhaust prior to reception by said heating element,
   wherein heating said particulate matter comprises igniting particulates to initiate a burn that propagates longitudinally along said PF.

3. The exhaust system of claim 1, wherein exhaust entering and exiting said radiant energy reflector block is in a state of turbulent flow.

4. The exhaust system of claim 1, wherein:
   exhaust entering said radiant energy reflector block is in a state of turbulent flow; and
   exhaust exiting said radiant energy reflector block is in a state of laminar flow.

* * * * *